US006831907B2

(12) United States Patent
Dolman et al.

(10) Patent No.: US 6,831,907 B2
(45) Date of Patent: Dec. 14, 2004

(54) DIGITAL FORMAT U.S. COMMERCIAL FM BROADCAST SYSTEM

(75) Inventors: Rodney A. Dolman, Forest, VA (US); Paul W. Dent, Pittsboro, NC (US)

(73) Assignee: Ericsson Inc., Research Triangle Park, NC (US)

(*) Notice: Subject to any disclaimer, the term of this patent is extended or adjusted under 35 U.S.C. 154(b) by 277 days.

(21) Appl. No.: 09/945,001

(22) Filed: Aug. 31, 2001

(65) Prior Publication Data

US 2003/0043769 A1 Mar. 6, 2003

(51) Int. Cl.[7] ................................................ H04B 7/212

(52) U.S. Cl. ....................................... 370/337; 370/537

(58) Field of Search ................................ 370/529, 536; 455/108, 88, 91, 104, 45, 74, 47, 63, 109; 375/260

(56) References Cited

U.S. PATENT DOCUMENTS

| | | | | | |
|---|---|---|---|---|---|
| 5,038,402 | A | * | 8/1991 | Robbins | 725/144 |
| 5,202,901 | A | | 4/1993 | Chennakeshu et al. | |
| 5,584,051 | A | | 12/1996 | Goeken | |
| 5,701,294 | A | * | 12/1997 | Ward et al. | 370/252 |
| 5,757,854 | A | * | 5/1998 | Hunsinger et al. | 375/260 |
| 5,790,527 | A | | 8/1998 | Kappagantula et al. | |
| 5,898,680 | A | * | 4/1999 | Johnstone et al. | 370/316 |
| 5,966,442 | A | * | 10/1999 | Sachdev | 380/212 |
| 6,067,445 | A | * | 5/2000 | Gray et al. | 455/45 |
| 6,243,427 | B1 | * | 6/2001 | Stockton et al. | 375/308 |
| 6,246,698 | B1 | | 6/2001 | Kumar | |
| 6,259,893 | B1 | * | 7/2001 | Kroeger et al. | 455/61 |
| 6,345,377 | B1 | * | 2/2002 | Kroeger et al. | 714/790 |
| 6,353,637 | B1 | * | 3/2002 | Mansour et al. | 375/260 |
| 6,430,227 | B1 | * | 8/2002 | Kroeger et al. | 375/260 |
| 6,510,175 | B1 | * | 1/2003 | Hunsinger et al. | 375/216 |
| 6,539,063 | B1 | * | 3/2003 | Peyla et al. | 375/267 |
| 6,549,544 | B1 | * | 4/2003 | Kroeger et al. | 370/482 |
| 6,556,639 | B1 | * | 4/2003 | Goldston et al. | 375/365 |
| 6,563,880 | B1 | * | 5/2003 | Hunsinger et al. | 375/260 |
| 6,590,944 | B1 | * | 7/2003 | Kroeger | 375/340 |

FOREIGN PATENT DOCUMENTS

| | | |
|---|---|---|
| EP | 0946011 | 9/1999 |
| EP | 1041756 | 10/2000 |

OTHER PUBLICATIONS

Hanzo, L. et al: "A mobile hi–fi digital audio broadcasting scheme" Vehicular Technology Conference, 1994 IEEE 22th Stockholm, Sweden Jun. 8–10, 1994, New York, NY, USA, IEEE, Jun. 8, 1994, pp. 1035–1039, XP010123233 ISBN: 0–7803–1927–3.

(List continued on next page.)

*Primary Examiner*—Wellington Chin
*Assistant Examiner*—William Schultz
(74) *Attorney, Agent, or Firm*—Coats & Bennett, PLLC

(57) ABSTRACT

A method of broadcasting commercial FM services in a digital format in at least one bitstream comprises time-division multiplexing the bitstream(s) into one or more channels comprising a data frame, and frequency modulating the data frames around a single carrier frequency into a commercial FM broadcast signal. The modulation may comprise GMSK or 8-PSK, and multiple data frame types may be interleaved. The signal is transmitted on a commercial FM broadcast station such that substantially the entire spectrum of the transmission comprises the digital data frames. The bit rate(s) of the digital bitstream(s) may be monitored, and the bitstream(s) may be reallocated to channels in the data frames based on changes in the bit rate(s). Analog and digital formats may be broadcast simultaneously on non-adjacent commercial FM broadcast carrier channels. A receiver is operative to extract and decode content from a digital format FM broadcast signal.

35 Claims, 5 Drawing Sheets

OTHER PUBLICATIONS

Kroeger, Brian W. et al: "Compatibility of FM Hybrid in–band on–channel (IBOC) system for digital audio broadcasting" IEEE Transactions on Broadcasting, IEEE Inc. New York, US, vol. 43, no. 4, Dec. 1997, pp. 421–430, XP002104795 ISSN: 0018–9316.

Schlereth A: "Digital algorithms for suppression of adjacent channel interference in FM receivers" Statistical Signal and Array Processing. Minneapolis, Apr. 27–30, 1993, Proceedings of the International Conference on Acoustics, Speech, and Signal Processing (ICASSP), New York, IEEE, US, vol. 4, Apr. 27, 1993, pp. 5–8, CP 010110632 ISBN: 0–7803–0946–4.

* cited by examiner

DIGITAL FORMAT U.S. COMMERCIAL FM BROADCAST SYSTEM

BACKGROUND OF THE INVENTION

The present invention relates generally to the field of commercial FM broadcasts, and specifically to a digital format broadcast system for U.S. commercial FM broadcasts.

FM radio broadcasts—regulated in the United States by the Federal Communications Commission (FCC)—are allocated to 100 carrier channels (channels 201–300), assigned to the frequency range 88 MHz to 108 MHz, with each carrier channel comprising 200 KHz of bandwidth. Channels 201–220, with carrier frequencies at 88.1 MHz to 91.9 MHz, are reserved for non-commercial educational broadcasts. The remainder of the FM channels, from 92.1 MHz to 107.9 MHz, are allocated to commercial FM broadcasts. As used herein, however, the term “commercial FM broadcasts” refers to all FCC-regulated broadcasts in the frequency range 88 MHz to 108 MHz. The vast majority of commercial FM stations broadcast in an analog stereo audio format, and are thus restricted to a single stream of audio (e.g., voice or music).

Recent developments in digital wireless communications services have proven that the wireless communication of information in a digital format makes dramatically more efficient use of the wireless spectrum than does transmission of the same information in an analog format. Various digital FM broadcast formats and transmission models have been proposed. For example, one system contemplates the simultaneous broadcast of standard FM analog audio within the existing 200 KHz bandwidth channels, with the additional broadcast of digital format content at a lower power in the frequencies immediately adjacent the FM channel. While this proposal maintains the functionality of existing analog commercial FM receivers, it requires extensive modification to commercial FM transmission stations to broadcast the digital information in new frequencies, as well as requiring licensing of additional spectrum.

SUMMARY OF THE INVENTION

The present invention relates in one aspect to a method of broadcasting services in a digital format comprising at least one digital bitstream. The method includes time-division multiplexing the bitstream(s) into one or more time slots comprising a data frame, and frequency modulating the resulting data frames around a single carrier frequency into a commercial FM broadcast signal. The signal is transmitted on a commercial FM broadcast station such that substantially the entire spectrum of the transmission comprises the digital data frames. The broadcast services may comprise FM audio programs; foreign language audio programs; paging messages; information services such as news, stock information, sports information, and weather information; entertainment services such as movies, audio programs, and games; and computer programs. In one embodiment, the bit rate(s) of the digital bitstream(s) is monitored, and the bitstream(s) may be reallocated to time slots in the data frames based on changes in the bit rate(s).

In some embodiments, the time-division multiplexing may comprise a TDMA wireless communications protocol, such as GSM, IS-54, USDC, PDC, MIRS, PACS-UB, DCS 1800, or PHS. In some embodiments, the frequency modulation may comprise a wireless communications protocol, such as GMSK, 8-PSK, $\pi/4$ DQPSK, $\pi/4$ DQPSK, 16-QAM, or GFSK.

In another aspect, the present invention relates to a system for broadcasting services in a digital format. The system includes a source of services formatted into at least one digital bitstream, a multiplexer for time-division multiplexing the digital bitstream(s) into one or more time slots comprising a data frame, a modulator for frequency modulating the data frames around a single carrier frequency into a commercial FM broadcast signal, and a transmitter for transmitting the broadcast signal on a commercial FM broadcast station such that substantially the entire spectrum of the transmission comprises the digital data frames. In one embodiment, the system additionally includes a controller operative to periodically monitor the bit rate(s) of the digital bitstream(s), and to reallocate the digital bitstream(s) to time slots in response to changes in the bit rate(s).

In another aspect, the present invention relates to a method of upgrading an analog format commercial FM broadcast station to digital format. The method includes providing the analog format content in at least one digital format bitstream. The existing signal modulator is replaced with a modulator operative to time division multiplex the at least one digital bitstream into a series of data frames. The data frames are then frequency modulated around a single carrier frequency and broadcast in conformance with commercial FM broadcast standards.

In another aspect, the present invention relates to a method of upgrading an analog format commercial FM broadcast station to simultaneously transmit both analog and digital format signals. A digital modulator and transmitter are provided, where the digital transmission is separated from the analog transmission by at least 9.8 MHz. The analog and digital transmission signals are then diplexed onto an existing broadcast tower antenna.

In yet another aspect, the present invention relates to a method of simultaneously broadcasting a signal in analog and digital formats. An analog format signal is broadcast on a first commercial FM broadcast station, frequency modulated around a first carrier frequency. The analog format signal is digitized into at least one digital bitstream, frequency modulated around a second carrier frequency, and broadcast on a second commercial FM broadcast station non-adjacent to the first commercial FM broadcast station, and in one embodiment, separated from the first station by at least 9.8 MHz.

In another aspect, the present invention relates to a digital FM receiver that is operative to receive multiple content streams, and distribute them to different users, such as via a wired or wireless network transmission medium.

In still another aspect, the present invention relates to a digital FM receiver that is operative to receive at least one content stream, and utilize empty or non-received channels in the digital data frame to reduce power or to search the FM band for other digital broadcasts.

DETAILED DESCRIPTION OF THE INVENTION

The existing commercial FM broadcast infrastructure in the United States is regulated by the Federal Communications Commission (FCC), to ensure that programming is in the public interest, and to avoid interference between broadcast channels. As used herein, the term "carrier channel" refers to the 200 KHz-wide bandwidth allocated to each commercial FM broadcast station, i.e., one of the eighty carrier channels with carrier frequencies from 88.1 MHz to 107.9 The term "provider" refers to the operator of a given FM channel, i.e., an FCC licensee that broadcasts content on a given carrier channel. The term "station" refers to equipment operated by the provider. The term "content" refers to the information or programming that is broadcast on a carrier channel, e.g., voice, music, or other information services such as audio-visual transmissions, paging services, subscription information services, and the like.

Figure 1:
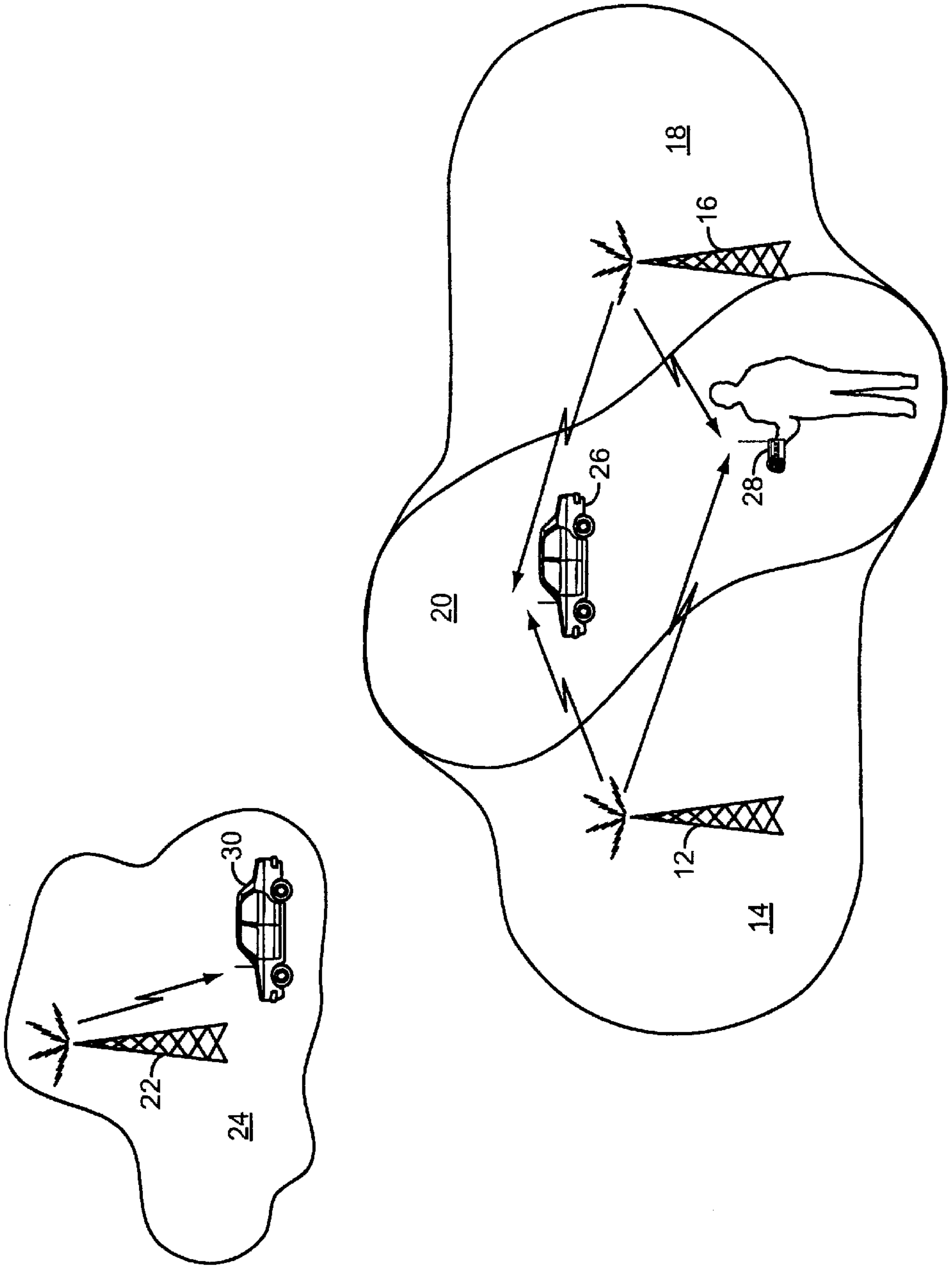
FIG. 1 is a representative diagram showing three commercial FM broadcast towers, their respective areas of coverage, and several FM receivers.

FIG. 1 is a representative diagram showing three commercial FM stations broadcasting commercial FM content on three FM carrier channels. Each station includes at least one broadcast tower 12, 16, 22. FM transmission tower 12 broadcasts an FM carrier channel that covers region 14. The definition of region 14 and its boundaries is determined by FCC regulations, in particular 47 C.F.R. §73.315. These definitions and regulations are known to those of skill in the art and are not discussed further herein. Broadcast station tower 16 broadcasts FM commercial content on an FM carrier channel sufficiently isolated from that of broadcast station 12, covering region 18. Note that regions 14 and 18 overlap in an area denoted as region 20. Within region 20, mobile receivers 26 and 28 may receive FM content broadcast by stations 12 and 16, by tuning to the respective FM carrier channels. FIG. 1 additionally depicts a third FM station tower 22, broadcasting over a region 24. FM content broadcast on the carrier channel associated with station 22 may be received by any receiver 30 located within region 24.

In granting licenses for commercial FM broadcasts, the FCC considers the geographic location of transmission towers 12, 16, and 22, the maximum allowable transmission power of those towers, and the FM carrier channels on which the stations will broadcast, to avoid interference between any of the carrier channels within the respective stations' reception areas. The current FM broadcast infrastructure thus includes frequency and geographic diversity in its spectrum allocation. This infrastructure has evolved over several decades, and its structure, parameters, and operation are familiar to broadcast providers, FCC regulators, and others of skill in the art.

By broadcasting commercial FM content in a digital format according to the present invention, the bandwidth utilization of existing FM stations is preserved. In other words, the digital transmission of broadcast services according to the present invention occupies essentially the same 200 KHz bandwidth as does existing analog audio FM transmission. Thus, by modifying existing FM stations to broadcast digital format content according to the present invention, the careful balance of transmission frequency, transmission power level, and geographic equipment location achieved by the licensing provisions of the FCC is preserved. Commercial FM providers need not apply for additional licenses to broadcast outside of their allocated frequencies. Also, the FCC need not reallocate FM carrier channels among existing stations to accommodate increased bandwidth needs or to avoid interference introduced by broadcasts outside of currently allocated frequencies. Thus the digital FM transmissions of the present invention are ensured of interference-free operation. Additionally, since the transmission frequency of a commercial FM station does not change when adopting the digital content format according to the present invention, the broadcast station need not make extensive investments in new transmission equipment. As will be explained more fully hereinafter, only the modulator of an existing station need be replaced.

According to the present invention, commercial FM broadcast services in digital format, comprising a plurality of content streams, are time-division multiplexed into a single continuous output signal. The time-division multiplexing of multiple communication streams into a single output signal, also known as Time Division Multiple Access (TDMA), is well known in the wireless communications arts, particularly in digital cellular telephony. In particular, the Global System for Mobile Communication (GSM), the prevalent digital cellular telephony protocol in Europe, utilizes TDMA multiplexing of multiple digital format communications signals to more efficiently utilize allocated spectrum, effectively increasing the call capacity, or number of simultaneous communications sessions supported. In addition, TDMA is utilized in wireless communications standards and protocols such as IS-54, USDC, PDC, MIRS, PACS-UB, DCS 1800, or PHS, which are known to those of skill in the art, are described in Wireless Communications Principles and Practices by Theodore Rappaport, ISBN#0-13-461088-1 (IEEE Press, Prentice Hall), incorporated herein by reference.

In TDMA protocols, the output signal is logically and temporally divided into frames of a specified duration, each of which is further divided into a specified number of time slots, or channels. A portion of each content stream is allocated to one or more particular channels in each frame. For example, the left stereo audio signal may by allocated to one channel, the right stereo audio signal to a second channel, a monaural talk program in one language to a third channel, and the talk program in a second language to a fourth channel. Successive portions of each content signal are thus transmitted in the output signal consecutively within a series of frames. Conversely, each frame contains a small portion of each content signal. A receiver demultiplexes the data frames, extracting consecutive portions of one or more content data streams, and reassembling the portions to reproduce the content.

As mentioned above, time division multiplexing allows multiple content streams to be modulated into the same digital FM broadcast. Broadcast stations may thus broadcast services in addition to stereo audio transmissions. The additional services may comprise advertiser-sponsored entertainment services, such as the simultaneous transmission of pop, country, and classical music, with each format (or alternatively the left and right stereo component of each format) occupying a different channel in a data frame. A broadcast station may thus greatly expand its customer base, essentially broadcasting multiple programs on a single broadcast carrier channel. Additionally or alternatively, a broadcast station may add new services, such as paging services or subscriber-based information services. To provide paging services, for example, one or more channels within a data frame may be allocated to the transmission of messages (either digitized audio or digital information), each message associated with a header field containing an address or identifier of a specific FM receiver. One or more channels may be allocated to information services, such as news, weather, sports updates, stock quotes, or other timely information. These information services may only be available to receivers that have been authorized, such as by having paid a subscription fee to the broadcast provider. The provision of subscription-based information services is well known, and many protocols known in the art exist to implement the necessary authorization and authentication. For example, many wireless communications systems offer such services.

In addition to giving broadcast providers the ability to offer new revenue-generating services, the time division multiplexing of digital content streams also provides flexibility and efficiency in operations through the ability to vary the allocation of channels within a data frame based on bandwidth needs. For example, one or more channels in a data frame may be held in reserve, or not allocated to the provision of content, by the broadcast provider. If a sudden, temporary increase in the number of paging messages, for example, were to occur, the broadcast provider may simply allocate one or more reserve channels to carrying the additional paging traffic. The adaptive allocation of channels also allows the broadcast provider to broadcast services requiring a higher bandwidth than one channel affords. For example, a broadcast provider may broadcast audio-visual content such as a movie, musical video, or sporting event (either on a continuous basis or as a collection of highlights). These higher bandwidth services may require the allocation of two, three, or more channels in a time division multiplexed data frame. At the conclusion of the high-bandwidth broadcast, the channels may be re-allocated to other broadcast services. The general principles of dynamic allocation of channels are also known in the art, in particular in the digital wireless communications arts.

In one embodiment of the present invention, two or more alternate time-division multiplexed data frames may be interleaved, or transmitted in alternate succession. This may allow for transmission of two or more sets of content, each in alternate frames. For example, consider two sets of content, A and B, each time-division multiplexed into separate data frames. Digital broadcast FM stations according to the present invention may broadcast both content A and content B data frames in alternate succession (one of skill in the art will readily recognize that each of content A and/or content B data frames may comprise multiple bitstreams time-division multiplexed therein). Particularly in implementations with high bit rates and with large compression ratios in the digitization, receivers may selectively receive, demodulate, decode, and reproduce only the appropriate content from either the A or B data frames. As compression and modulation efficiency increase through technological innovation, multiple varieties of content (i.e., content C, D, E, etc.) may be interleaved, such as on a round-robin basis, further increasing the number of programs that the station may broadcast. Alternatively, a larger number of time slots may be made available for broadcast of a single content type, by assigning digital bitstreams to time slots in two or more data frames, and interleaving the data frames in the transmission.

In addition to supporting multiple bitstreams using TDMA, the GSM protocol also utilizes a Gaussian Minimum-Shift Keying (GMSK) modulation protocol. GMSK modulation is a type of constant-envelope Phase Shift Key (FSK) modulation, wherein the frequency modulation is a result of a carefully contrived phase modulation. An important feature of GMSK modulation is that it is a constant-envelope modulation, thus lacking any significant amplitude modulation (AM) component in the carrier frequency. This inherently limits the bandwidth consumed by a GMSK modulated signal, and also makes it suitable for use with high-efficiency amplifiers.

Another modulation protocol compatible with GSM communications systems is 8-PSK. In 8-PSK, eight possible phase shifts of a carrier frequency, for example, 0, 45, 90, 135, 180, 225, 270 and 315 degrees, are used to encode digital information onto the carrier signal. The eight possible states of the signal allow for the simultaneous encoding of three digital bits, thus allowing for a high density, or efficiency of modulation. Of particular relevance to the present invention is that both the GMSK and 8-PSK modulation schemes, when incorporated into the GSM communications protocol, generate a traffic carrier channel signal that occupies a bandwidth of 200 KHz, essentially the same as that of a standard commercial FM analog audio transmission.

The 8-PSK format used in the GSM enhancement known as EDGE is not a constant envelope format, but rather is a linear modulation having a varying amplitude. If it is desired to use existing constant envelope FM transmitters, either the constant envelope form of 8-PSK can be used, or else the existing FM transmitter can be provided with a high-level amplitude modulator to impress the AM components of a linear modulation using a polar modulation configuration. Additional linear modulation techniques, known in the wireless communications arts and described in Rappaport, supra, then may find utility in the present invention, and may include $\pi/4$ DQPSK, $\pi/4$ DQPSK, 16-QAM, and the like.

Figure 2:
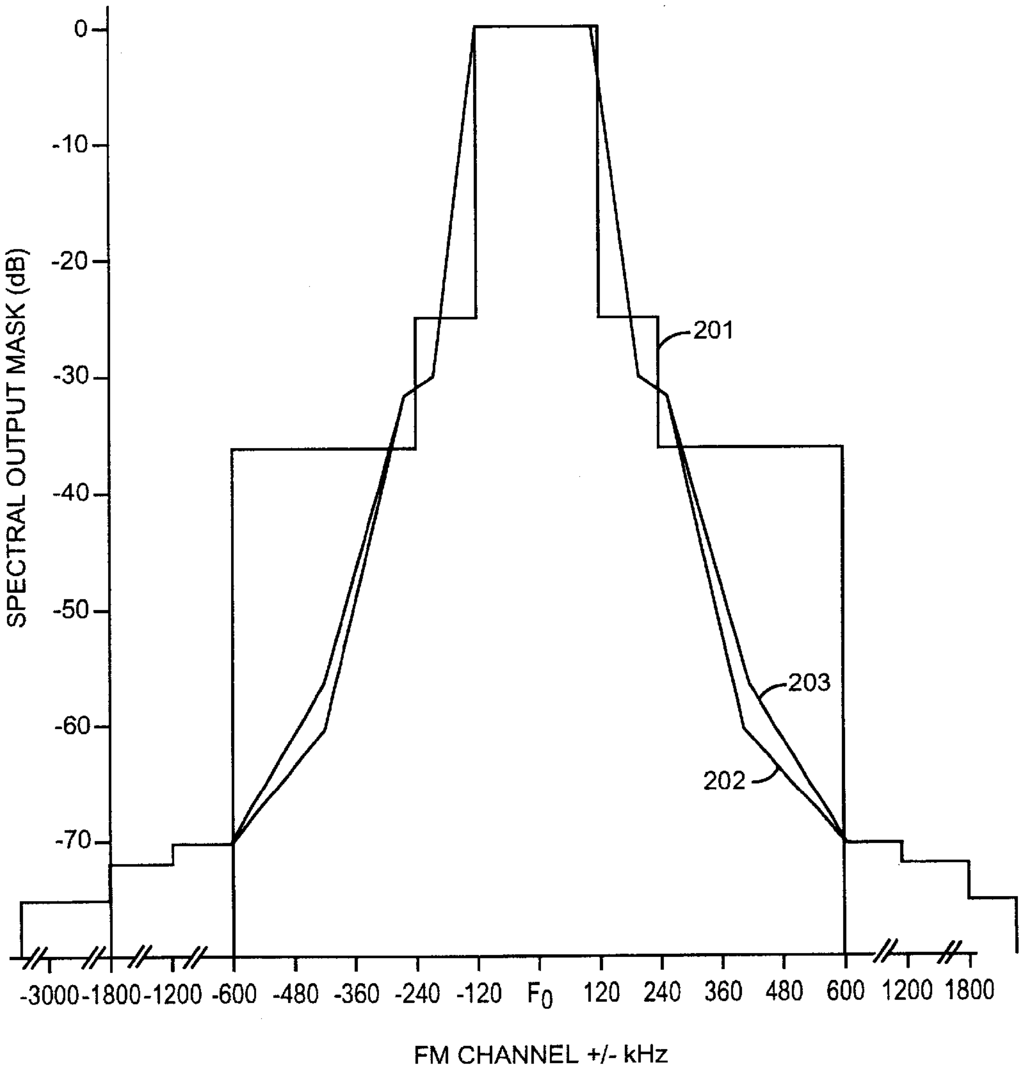
FIG. 2 is a graph depicting the frequency domain spectrum of conventional FM analog transmission and both GMSK and 8-PSK modulated traffic channels in the GSM protocol.

FIG. 2 depicts the frequency utilization of a commercial FM audio carrier channel, with a GSM traffic carrier channel superimposed thereon. The step function 201 represents the broadcast spectrum requirements imposed on commercial FM broadcast stations by the FCC. The majority of output power in the FM signal, i.e., up to 25 dB attenuation, is confined by function 201 to within 100 KHz on either side of the carrier frequency $F_0$, thus occupying a total of 200 KHz of bandwidth. Only very low powered portions of the broadcast signal (25 dB to 35 dB attenuation) are allowed to spill over into ±240 kHz of the carrier frequency $F_0$, and still lower power (above 35 dB attenuation) to occupy greater portions of the spectrum. The entire signal is confined to 1200 KHz, i.e., ±600 kHz around the carrier $F_0$.

Superimposed on the function 201 representing FCC restrictions is the graph of a typical GMSK-modulated GSM forward traffic carrier channel signal 202. The GSM signal 202 substantially complies with the FCC requirements as depicted in function 201, through at least 70 dB of attenuation. Also depicted in FIG. 2 is a graph of a GSM signal modulated via the 8-PSK modulation protocol, indicated at 203. The GMSK and 8-PSK signals 202, 203 occupy nearly identical spectrum, although the 8-PSK allows for a higher density of digital information, and is thus more efficient.

Many features of the GSM wireless communications system are applicable to the broadcast of digital format commercial FM content, according to the present invention. In particular, time divisional multiplexing and phase shift keying (e.g., GMSK or 8-PSK) have been discussed above. Many other features, protocols, and specifications of the GSM system are directly applicable to digital FM broadcasts. For example, the GSM system includes protocols for error detection and correction, optimized for the 800 and 1900 MHz frequency bands. Since commercial FM broadcasts occupy 88–108 MHz, a significantly lower frequency range, the transmissions are less prone to errors, and thus less sophisticated error detection and correction schemes may be necessary, freeing up additional bandwidth for more efficient exploitation by broadcast content. The GSM system has been widely deployed and in actual operation for a considerable time. Significant a priori knowledge related to system design and operation garnered from the GSM system is directly applicable to the broadcast of digital FM content according to the present invention, significantly lowering the risk and implementation time frame of operational digital FM broadcasts. Conversely, much of the GSM system that implements two-way communications, identifies and tracks users, maintains overhead such as tracking air time for billing purposes, and the like, is inapplicable to the broadcast-only operation of the present invention, and may be omitted, further reducing costs and/or expanding usable bandwidth.

The digital FM broadcast system of the present invention, using for example, the GSM system as a model, is particularly suited for upgrading or retrofitting existing FM analog audio broadcast stations and facilities for digital transmission. Since the bandwidth of a carrier channel is essentially the same as the bandwidth of the current analog carrier channel, the same transmission equipment may be utilized. Only the modulator need be replaced, with a modulator capable of implementing GSMK, 8-PSK, or a compatible modulation protocol. Additionally, a TDMA mixer and suitable equipment to input digital bitstreams, if necessary, may be required. Particularly when considering the entire national infrastructure of FM broadcast stations, this represents an enormous cost savings over a digital FM implementation requiring a significant amount of new equipment.

Due to the greater efficiency of digital FM broadcasts as compared to the present analog audio broadcasts, and the ability to add additional revenue-generating services afforded by digital time division multiplexing, it is highly likely that commercial FM broadcasts will eventually transition to an exclusively digital format. This transition will require equipment upgrades, both on the part of broadcast stations and consumers. While the digital commercial FM broadcast of the present invention minimizes the cost of upgrades to broadcast stations (as it requires only the replacement of a modulator and utilizes existing transmission equipment), consumers will need to upgrade their FM radios to receivers capable of demodulating and decoding the digital format commercial FM broadcasts. During the transition period, it may be advantageous for broadcast stations to both maintain analog audio transmissions and introduce digital transmissions. Although the digital transmission format according to the present invention requires no additional spectrum over analog format broadcasts, as it utilizes the same bandwidth, the simultaneous broadcast of both analog and digital formats will require the allocation of new spectrum, and will require broadcast stations to acquire additional licenses. However, it would obviously be economically advantageous for broadcast providers to be able to utilize existing broadcast towers for transmitting both analog and digital formats.

Figure 3:
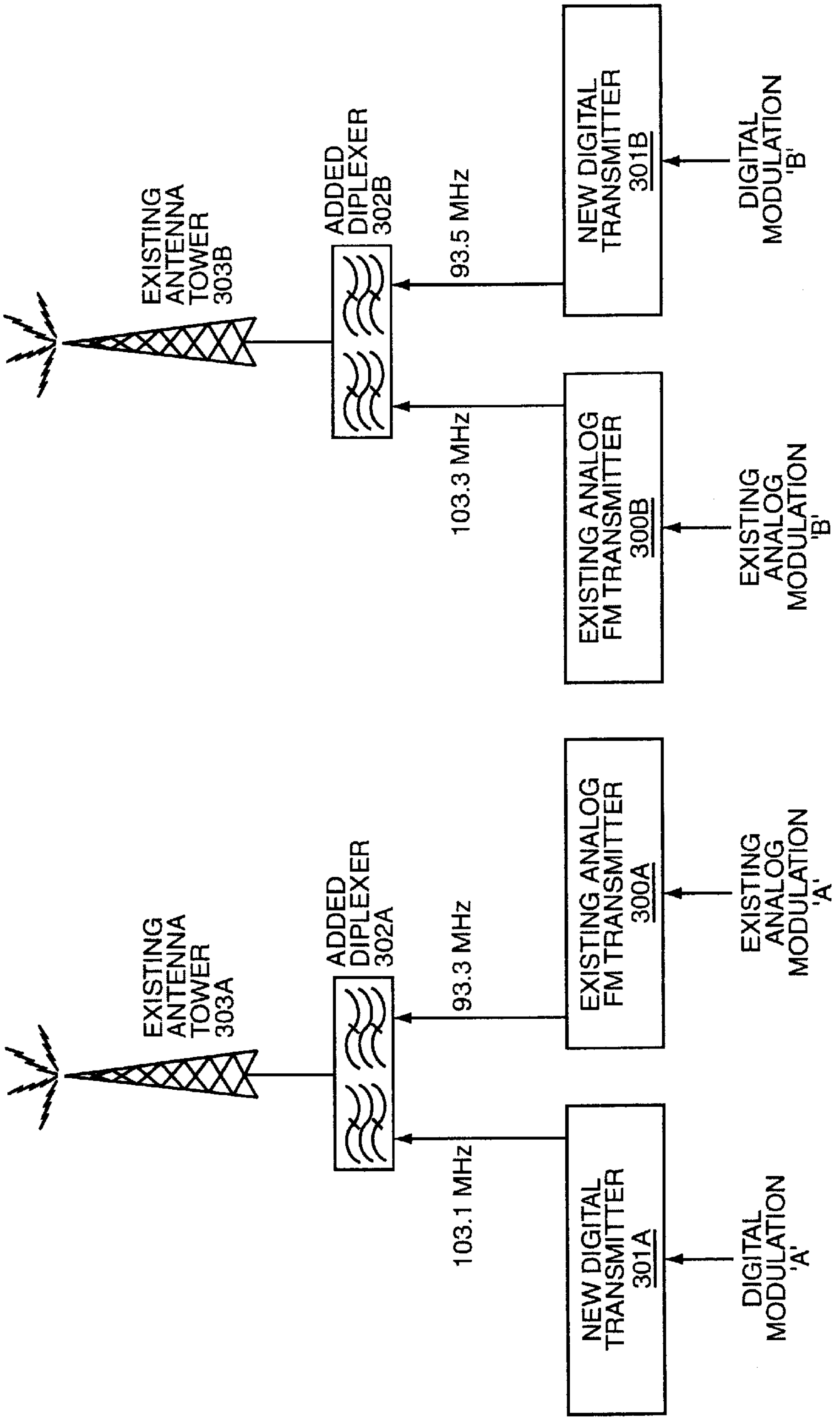
FIG. 3 is a functional block diagram depicting the simultaneous transmission of analog and digital format FM signals from each of two broadcast towers.

To transmit two programs from the same antenna tower using separate high-power transmitters for each program, the frequency separation of the transmitters should be sufficient to permit combining into the single antenna by means of diplexing filters. FIG. 3 shows the use of diplexing filter 302A to couple an existing analog FM transmitter 300A and a new digital transmitter 301A to the same antenna 303A, while at another site diplexer 303B couples existing analog FM transmitter 300B and new digital transmitter 301B to antenna tower 303B. At both sites, the frequency separation between the existing analog transmitter and the new digital transmitter is about 9.8 MHz, which is sufficient to allow a low-loss diplexing filter to be constructed.

Figure 4:
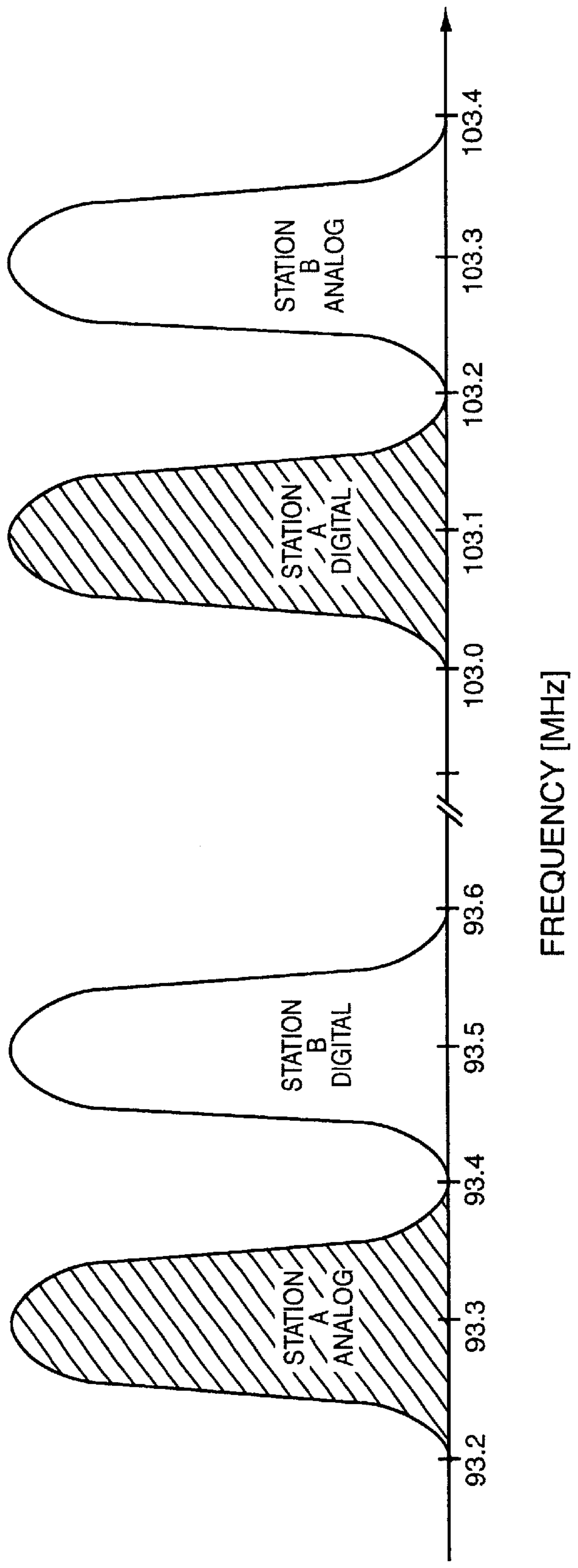
FIG. 4 is a frequency domain graph depicting the simultaneous broadcast of analog and digital format FM channels for two broadcast providers.

One possible frequency allocation of these transmissions is depicted in FIG. 4. The new digital transmitter for provider A operates on the carrier channel 103.1 MHz, in this example adjacent to the analog FM provider B's transmission on 103.3 MHz. The new digital transmitter for provider B operates on the carrier channel 93.5 MHz, adjacent to provider A's existing analog transmission at 93.3 MHz. This arrangement maintains a 9.8 MHz separation between the analog and digital transmissions of providers A and B, allowing each to transmit both formats from its own tower, for example using the transmitters and diplexers of FIG. 3.

If on the other hand provider A were awarded use of the carrier channel 93.5 MHz for digital transmission, adjacent to its existing 93.3 MHz allocation, and conversely provider B had been awarded use of 103.1 MHz for digital transmissions, adjacent its existing 103.3 allocation, the same arrangement as in FIG. 4 could be used, however by reciprocal agreement between the providers, the digital programming from provider A would instead be applied to the modulation input of transmitter 301B while the digital programming for provider B would be applied to the modulation input of transmitter 301A. Many other frequency allocation and tower utilization arrangements are of course possible, and may be crafted in each case to make most efficient use of both the available spectrum and existing broadcast infrastructure.

One feature of digital transmissions is the improved capability of transmit macrodiversity, also known as "simulcast" in other contexts. Simulcast refers to the transmission of the same signal on the same station from adjacent sites, with the goal of extending the coverage area to that of both sites. When the simulcast signal is an analog FM signal, it is well known that the audio modulation must be accurately synchronized across all simulcast sites to avoid distortion. On the other hand, when digital simulcast or macrodiversity is used, it is known that the digital modulation should be deliberately offset by one or more modulation symbol periods between two adjacent sites. This offset allows a receiver to treat the multiple received signals as delayed multipath propagation, which is advantageous when using a multipath equalizer at the receiver. This technique can be used to cover an extended service area with multiple towers without requiring separate frequency allocations for tower. While simulcast can also be used with analog FM to provide extended area coverage, this only provides audio quality sufficient for landmobile radio applications, such as police, emergency services and taxicab communications, and may be insufficient for hi-fi music. On the other hand, simulcast or macrodiversity, when used with digital transmission, does not limit or degrade the achievable audio quality, but rather mitigates fading when received by mobile receivers. Using digital macrodiversity to mitigate fading, much lower transmitter power suffices to cover a given area reliably. The lower power digital transmissions reduce the potential interference with analog transmissions, and may allow the use of the adjacent channels that are presently unused in a given area. In principle, a nationwide service could be provided using a single frequency station broadcasting the same digital program from all towers.

Figure 5:
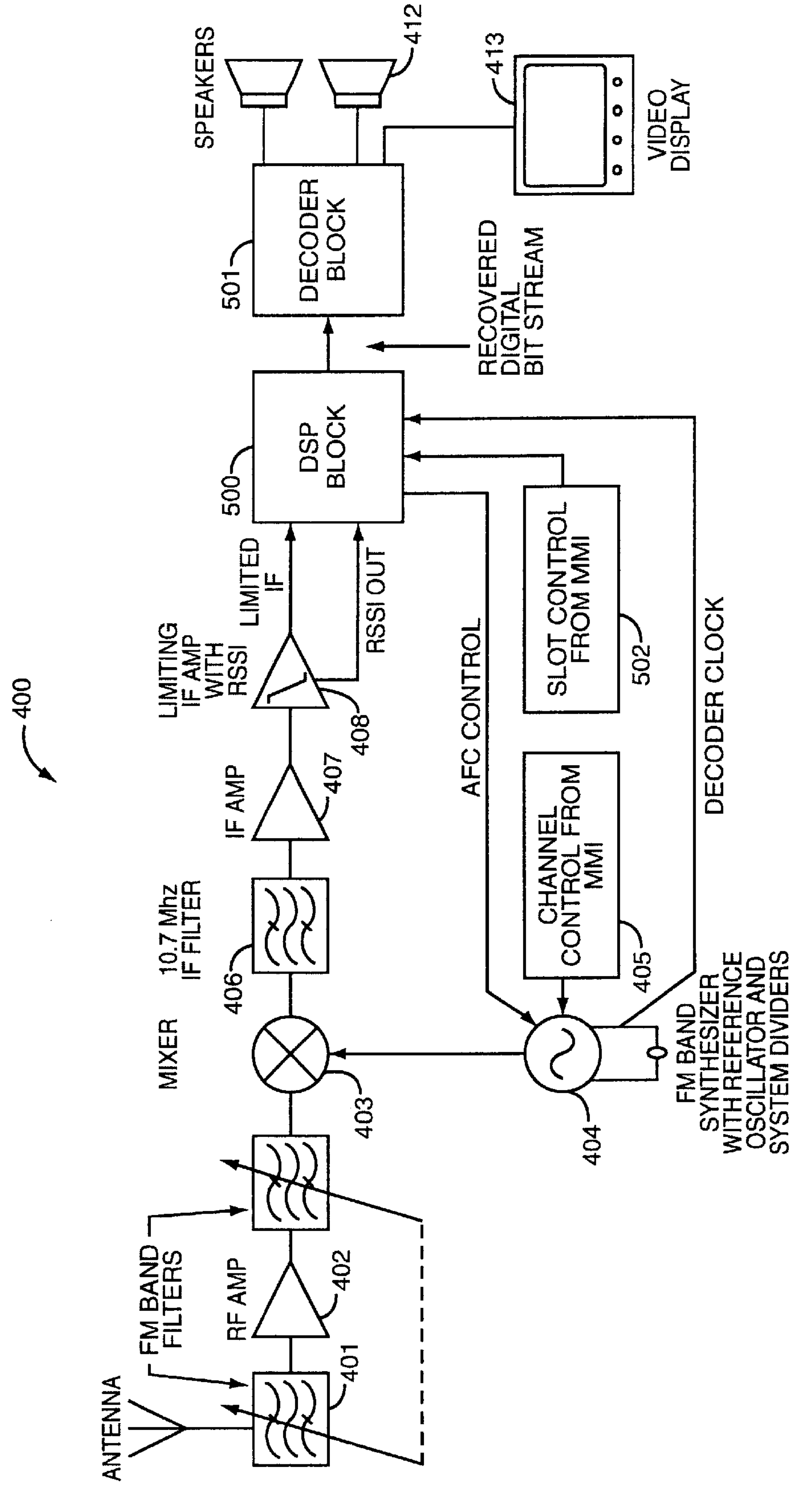
FIG. 5 is a functional block diagram of a receiver operative to receive digital format FM broadcasts, according to one embodiment of the present invention.

A receiver operative to receive digital FM transmissions according to the present invention is depicted in FIG. 5, and indicated generally by the number 400. The receiver 400 is operative to receive digital format commercial FM broadcasts as described hereinabove. As used herein, the term "receive" encompasses reception of RF electromagnetic signals, amplification, demodulation, decoding, digital signal processing, and/or such other operations as may be necessary or desired to render the content of the received signal intelligible to a user. The receiver 400 comprises tunable FM-band filters 401; a Radio Frequency (RF) amplifier 402; a mixer 403; a switchable frequency synthesizer 404 controlled by user channel selection inputs from a Man-Machine-Interface (MMI) 405; an Intermediate Frequency (IF) filter 406, an IF amplifier 407; at least one limiting amplifier stage 408 with a Radio Signal Strength Indication (RSSI) output; a DSP block 500, a decoder block 501, and output transducers such as speakers 412, a video display 413, and the like.

The filters 401 pass frequencies in the FM band that are amplified by the RF amplifier 402. The filtered and amplified signal passes to the mixer 403, which combines the RF signal with a locally generated wave produced by the switchable frequency synthesizer 404, thus converting the RF signal to an intermediate frequency. The intermediate frequency signal at the mixer 403 output is filtered by the IF filter 406 to remove noise and undesired signals and then amplified by the IF amplifier 407. The limiting IF amplifier 408, which may comprise a series of cascaded amplifiers, includes RSSI detection and an output per amplifier state indicative of the RSSI. U.S. Pat. No. 5,048,059 to Dent entitled "Log-Polar signal processing" describes how simultaneous use of the limited output of amplifier 408 and the RSSI output can provide digitized complex samples representative in log-polar notation of any bandlimited signal. The phase or angle information may be extracted by a phase digitizer, as described in U.S. Pat. Nos. 5,084,669 and 5,136,616 to Dent. In the case where the limiting amplifier 408 comprises multiple stages, each with an associated RSSI detector, the RSSI signals may be time-aligned and combined using a method such as described in U.S. Pat. No. 5,070,303 to Dent. The above patents are all commonly assigned to the Assignee of the present application, and are hereby incorporated by reference in their entirety.

Block 500 of FIG. 5 may incorporate a log-polar digitizer in order to provide complex numerical samples for processing. A preferred sampling rate is 13 MHz/48, and the 200 KHz channel spacing is derived as 13 MHz/65 by frequency synthesizer 404, thus allowing the radio to employ a single 13 MHz crystal reference oscillator. Block 500 outputs an Automatic Frequency Control (AFC) signal to the switchable frequency synthesizer 404. Block 500 then processes the complex sample stream using numerical signal processing to digitally decode signals received through a multipath and fading channel to reproduce the digital data, as is well known in the wireless communications arts. Block 500 also receives Channel Control from MMI 502, to select one or more channels of content from within the time-division multiplexed data frame. The extracted digital audio or video may be in a compressed form such as MP3 or MPEG II, respectively, which may be decompressed and decoded in Block 501. The decoded signals may for example comprise 16-bit Pulse-Code Modulated (PCM) bitstreams that are sent to digital-to-analog converters also contained in Block 501. The recovered analog audio and/or video is then sent to speakers or headphones 412 and video display 413, respectively.

One or both of blocks 500 and 501 may be implemented with software programmable digital signal processors, with associated memory containing appropriately coded instructions in software or firmware. Alternatively, one or both of blocks 500, 501 may comprise custom digital signal processing circuits implemented as Application Specific Integrated Circuits (ASICs) as known in the digital electronics arts. The ASIC approach may be particularly suited for block 501, as specialized circuitry designed for efficient decoding of digital multimedia compression and transmission standards becomes widely available.

The receiver 400 may additionally be operative to receive both traditional analog audio FM transmissions, and digital time-division multiplexed FM transmissions according to the present invention, using substantially the same components. For example, Block 500 may process the complex sample stream from the limiting IF amp 408 and its RSSI outputs using numerical signal processing to digitally decode an analog stereo or mono transmission. Decoded analog audio transmissions may be output from Block 500 as 16-bit Pulse-Code Modulated (PCM) streams, that are sent to digital-to-analog converters in Block 501, which then output analog audio to right and left channel audio amplifiers and speakers to reproduce the conventionally-transmitted stereo audio signal. Such a dual-mode receiver may find particular utility during the transition from conventional analog audio FM transmission to the digital format FM transmission of the present invention. Indeed, a dual-mode receiver that is suitable for low-cost, high-volume manufacture, and is backward compatible with the existing FM standard may be essential to the success of the broadcast format of the present invention as a consumer entertainment industry standard.

In one embodiment, the receiver 400 extracts and decodes content from one or more channels of the time-division multiplexed data frames transmitted in the digital format FM broadcast. The other channels may be empty, or they may contain other content, i.e., content not selected by the user. The receiver 400 has "free time" during the unused channels. This time may be used to save power in portable, battery-operated receivers 400, such as by initiating a "sleep mode," as is well known in the art. Alternatively, using a fast-switching (agile) synthesizer 404, the receiver 400 may be tuned to receive content from a totally different carrier channel during these times. Thus, with no extra hardware, the receiver 400 may receive signals from more than one digital FM broadcast at the same time. Thus different passengers in a vehicle can listen (with headphones, for example) to different digital FM stations at the same time using the same apparatus, providing that the channels on which the information is broadcast do not overlap. The receiver 400 may also, during unused channels, scan the FM band for digital FM broadcasts and use information bits included in those broadcasts to identify the programming being broadcast, this then being displayed to users in the form of a menu of available entertainment or multi-media information. When an item is selected from the menu, the data frame channels it occupies may be compared with the channels necessary to receive other items on the menu and they may be marked as unavailable if the channels overlap. For such a system to be most useful to the user, it would behoove different FM broadcasting stations to synchronize their frame and channel formats so that a channel from one station overlaps only one channel from another station, and does not partially overlap two channels. Some guard bits between channels may be included in the format to avoid channels overlap, even in the face of different propagation delays between nearby and more distant stations. In any case, adjacent channels from different stations may not be receivable due to the time needed to switch the frequency synthesizer 404 from one frequency to another. It is relatively easy however to build synthesizers that will switch carrier channels in about half a slot period. For example, a 1.6 GHz frequency synthesizer as used in many cellular phones can have 3.2 MHz channel spacing, its output being divided by sixteen to produce a 100 MHz local oscillator having 200 kHz steps.

In another embodiment, the receiver 400 may decode a plurality of channels for a particular FM station, and send the programming contained in each channel to different passengers in a vehicle, each of whom can then select the programming they desire from the station. The method for distribution within the vehicle may be by wired connections to each passenger location, or via a short-range wireless network such as BLUETOOTH®, and appropriately enabled headset devices.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A method of broadcasting services, comprising:

formatting said services into at least one digital bitstream;

time division multiplexing said at least one digital bitstream into one or more channels comprising a primary data frame according to a digital cellular wireless communication standard;

frequency modulating a series of data frames around a single carrier frequency into a broadcast signal in conformance with commercial FM broadcast standards; and transmitting said broadcast signal on a commercial FM broadcast station such that substantially the entire spectrum of said transmission comprises said digital data frames.

2. The method of claim 1, additionally comprising time division multiplexing said at least one digital bitstream into one or more channels comprising a secondary data frame, and wherein frequency modulating a series of data frames comprises interleaving said primary data frames and said secondary data frames.

3. The method of claim 2, additionally comprising time division multiplexing said at least one digital bitstream into one or more channels comprising a tertiary data frame, and wherein frequency modulating a series of data frames comprises interleaving said primary, secondary and tertiary data frames in alternate order.

4. The method of claim 1, wherein said digital cellular wireless communication standard is selected from the group consisting of GSM, IS-54, USDC, PDC, MIRS, PACS-UB, DCS 1800, and PHS.

5. The method of claim 1, wherein frequency modulating said data frames around a single carrier frequency into a broadcast signal in conformance with commercial FM broadcast standards comprises modulating said data frames according to any modulation technique suitable for impressing digital modulation onto a radio frequency carrier, wherein said carrier frequency is selected from available commercial FM broadcast carrier frequencies.

6. The method of claim 5, wherein said modulation technique is selected from the group consisting of GMSK, 8-PSK, π/4 DQPSK, π/4 DQPSK, 16-QAM, and GFSK.

7. The method of claim 1, wherein said services are selected from the group including FM audio programs, foreign language audio programs, paging messages, information services, entertainment services, and computer programs.

8. The method of claim 7, wherein said information services are selected from the group including news, stock information, sports information, and weather information.

9. The method of claim 7, wherein said entertainment services are selected from the group including movies, audio programs, and games.

10. A system for broadcasting services, comprising:

a source of said services formatted into at least one digital bitstream;

a multiplexer for time division multiplexing said at least one digital bitstream according to a digital cellular wireless communication standard into one or more channels comprising a primary data frame;

a modulator for frequency modulating a series of data frames around a single carrier frequency into a broadcast signal in conformance with commercial FM broadcast standards; and a transmitter for transmitting said broadcast signal on a commercial FM broadcast carrier channel such that substantially the entire spectrum of said transmission comprises said digital data frames.

11. The system of claim 10, additionally comprising a multiplexer for time division multiplexing said at least one digital bitstream into one or more channels comprising a secondary data frame, and wherein said modulator frequency modulates a series of data frames by interleaving said primary data frames and said secondary data frames.

12. The system of claim 11, additionally comprising a multiplexer for time division multiplexing said at least one digital bitstream into one or more channels comprising a tertiary data frame, and wherein said modulator frequency modulates a series of data frames by interleaving said primary, secondary and tertiary data frames in alternate order.

13. The system of claim 10, wherein said digital cellular wireless communication standard is selected from the group consisting of GSM, IS-54, USDC, PDC, MIRS, PACS-UB, DCS 1800, and PHS.

14. The system of claim 10, wherein said modulator is operative to modulate said data frames according to any modulation technique suitable for impressing digital modulation onto a radio frequency carrier, wherein said carrier frequency is selected from available commercial FM broadcast carrier frequencies.

15. The system of claim 14, wherein said modulation technique is selected from the group consisting of GMSK, 8-PSK, π/4 DQPSK, π/4 DQPSK, 16-QAM, and GFSK.

16. A method of simultaneously broadcasting content in analog and digital formats, comprising:

broadcasting said content in an analog format on a first commercial FM broadcast carrier channel, said analog format content frequency modulated around a first carrier frequency;

providing said analog format signal in at least one digital format bitstream;

frequency modulating said at least one digital bitstream around a second carrier frequency; and broadcasting said digital bitstream on a second commercial FM broadcast carrier channel non-adjacent to said first commercial FM broadcast carrier channel.

17. The method of claim 16, wherein said first commercial FM broadcast carrier channel and said second commercial FM broadcast carrier channel are separated in frequency by at least 9.8 MHz.

18. The method of claim 16, wherein said first commercial FM broadcast carrier channel and said second commercial FM broadcast carrier channel are broadcast from the same transmission tower.

19. A method of upgrading an analog format commercial FM broadcast station to digital format, comprising:

providing analog format content in at least one digital format bitstream; and replacing an existing signal modulator with a modulator operative to time division multiplex said at least one digital bitstream into a series of data frames, and to frequency modulate said series of data frames around a single carrier frequency in conformance with commercial FM broadcast standards.

20. A method of upgrading an analog format commercial FM broadcast station comprising an analog FM modulator, analog FM transmitter, and transmission antenna to broadcast in both analog and digital format, comprising:

providing analog format content in at least one digital format bitstream;

modulating said digital format bitstream with a modulator operative to time division multiplex said at least one digital bitstream into a series of data frames according to a digital cellular wireless communication standard, and to frequency modulate said series of data frames around a single carrier frequency in conformance with commercial FM broadcast standards, providing a transmitter operative to transmit said modulated digital format; and diplexing said analog and digital transmissions into said transmission antenna.

21. A receiver operative to receive digital format broadcast signals within the commercial FM band, said signals comprising at least one digital bitstream time division multiplexed according to a cellular wireless communication standard into one or more channels comprising a data frame, a series of said data frames frequency modulated around a single carrier frequency and transmitted in conformance with commercial FM broadcast standards.

22. The receiver of claim 21, wherein said receiver is operative to receive said at least one digital bitstream from one of two or more interleaved data frames containing different content.

23. The receiver of claim 21, wherein said receiver is operative to receive said at least one digital bitstream from less than all available channels in said data frame, and wherein said receiver utilizes the time representing the channels of said data frame not used by said bitstream to reduce its power consumption.

24. The receiver of claim 21, wherein said receiver is operative to receive said at least one digital bitstream from less than all available channels in said data frame of a first FM carrier channel, and wherein said receiver utilizes the time representing the channels of said data frame not used by said bitstream to tune to a second FM carrier channel, and receive one or more bitstreams transmitted on said second carrier channel, on a non-interfering basis with said bitstream transmitted on said first carrier channel.

25. The receiver of claim 21, wherein said receiver is operative to receive said at least one digital bitstream from less than all available channels in said data frame, and wherein said receiver utilizes the time representing the channels of said data frame not used by said bitstream to scan the FM band for digital FM broadcasts.

26. The receiver of claim 25, wherein said digital FM broadcasts include information bits identifying programming being broadcast, and wherein said receiver is operative to decode said information bits and indicate other programming currently available.

27. The receiver of claim 26, wherein said information bits identifying other programming being broadcast additionally indicate the timing of said programming in time division multiplexed channels, and wherein said receiver's indications of other programming currently available includes consideration of the channels utilized by the respective programming.

28. The receiver of claim 21, said receiver operative to receive two or more said bitstreams.

29. The receiver of claim 28, wherein the content encoded into each said bitstream is distributed to a different user by a distribution medium selected from the list consisting of wire and a short range wireless network.

30. The method of claim 1, additionally comprising:

periodically monitoring the bit rate of said at least one digital bitstream, and reallocating said at least one digital bitstream to said channels in response to changes in said bit rate.

31. The method of claim 10, additionally comprising:

a controller operative to periodically monitor the bit rate of said at least one digital bitstream, and to reallocate said at least one digital bitstream to said channels in response to changes in said bit rate.

32. The method of claim 16, wherein said first commercial FM broadcast carrier channel and said second commercial FM broadcast carrier channel are separated in frequency by at least one other commercial FM broadcast carrier channel.

33. The method of claim 19, wherein said modulator is operative to modulate said data frames according to a modulation standard selected from the group consisting of GMSK, 8-PSK, π/4 DQPSK, π/4 DQPSK, 16-QAM, and GFSK, wherein said carrier frequency is selected from available commercial FM broadcast carrier frequencies.

34. The method of claim 20, wherein said single carrier frequency of said digital FM modulator is separated from the frequency of said analog FM modulator by at least 9.8 MHz.

35. The receiver of claim 21, wherein said receiver is operative to receive said at least one digital bitstream from two or more of said channels.

* * * * *